(12) United States Patent
Jang et al.

(10) Patent No.: US 8,116,834 B2
(45) Date of Patent: Feb. 14, 2012

(54) MOBILE TERMINAL WITH TILTING DISPLAY

(75) Inventors: Chang-Yong Jang, Seoul (KR); Choong-Hyoun Cho, Seoul (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 348 days.

(21) Appl. No.: 12/393,850

(22) Filed: Feb. 26, 2009

(65) Prior Publication Data

US 2010/0004027 A1    Jan. 7, 2010

(30) Foreign Application Priority Data

Jul. 7, 2008  (KR) .................. 10-2008-0065663

(51) Int. Cl.
*H04M 1/00* (2006.01)
(52) U.S. Cl. .............. 455/575.4; 455/566; 455/575.1
(58) Field of Classification Search ........... 455/575.01–575.04, 566
See application file for complete search history.

(56) References Cited

U.S. PATENT DOCUMENTS

| | | | | |
|---|---|---|---|---|
| 7,149,557 B2 * | 12/2006 | Chadha | ............. | 455/575.1 |
| 7,426,115 B2 * | 9/2008 | Shih et al. | ............. | 361/756 |
| 7,555,120 B2 * | 6/2009 | Joo | ............. | 379/433.12 |
| 7,630,744 B2 * | 12/2009 | Lee | ............. | 455/575.4 |
| 7,653,422 B2 * | 1/2010 | Roberts | ............. | 455/575.4 |
| 2005/0068337 A1 | 3/2005 | Duarte et al. | | |
| 2005/0176471 A1 * | 8/2005 | Masuda et al. | ............. | 455/566 |
| 2006/0252471 A1 * | 11/2006 | Pan | ............. | 455/575.4 |
| 2007/0197270 A1 * | 8/2007 | Kim | ............. | 455/575.4 |
| 2008/0081505 A1 * | 4/2008 | Ou et al. | ............. | 439/374 |
| 2009/0149230 A1 * | 6/2009 | Ruan | ............. | 455/575.4 |
| 2010/0113100 A1 * | 5/2010 | Harmon et al. | ............. | 455/566 |

FOREIGN PATENT DOCUMENTS

| | | |
|---|---|---|
| CN | 2731854 | 10/2005 |
| DE | 3836406 | 5/1990 |
| GB | 2381774 | 5/2003 |
| JP | 2006186577 | 7/2006 |

* cited by examiner

*Primary Examiner* — Vibol Tan
(74) *Attorney, Agent, or Firm* — Lee, Hong, Degerman, Kang & Waimey

(57) ABSTRACT

A slide type mobile terminal having a first body and a second body is provided. The first body includes a display and a first slide member. The second body includes a key pad and is slidably coupled to the first body. The second body includes a second slide member to slidably engage the corresponding first slide member of the first body to allow movement of the first body and the second body to enable one of closed or tilted configurations. One of the first and second slide members has a curvature along at least one end such that when the first body is extended from the second body, the first body is tilted at a predetermined angle with respect to the second body. The first body receives a portion of the second body and the second body receives a portion of the first body in the closed position.

18 Claims, 7 Drawing Sheets

MOBILE TERMINAL WITH TILTING DISPLAY

CROSS-REFERENCE TO RELATED APPLICATIONS

Pursuant to 35 U.S.C. §119, this application claims the benefit of Korean Application No. 10-2008-0065663, filed on Jul. 7, 2008, the contents of which is hereby incorporated by reference herein in its entirety.

FIELD OF THE INVENTION

The present invention relates to mobile communication terminals, and particularly, to the configuration of mobile communication terminals.

DESCRIPTION OF THE RELATED ART

A mobile terminal is a mobile electronic device, which is equipped with one or more functions, such as a voice or video telephony call function, an information input/output function, and a data storage function.

The diversity in the functions available in modern mobile terminals is rapidly expanding. For example, mobile terminals typically include a number of complicated functions, such as taking photos or videos, displaying music files or video files, playing games, and receiving broadcasts. Moreover, mobile terminals are being implemented as integrated multimedia devices.

Various attempts have been made to implement complicated functions in such mobile terminals by means of hardware and/or software. For example, a user interface environment is typically provided in a mobile terminal to enable a user to easily and conveniently search for or select among available functions.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the invention, a slide type mobile terminal is provided. The mobile terminal includes a first body comprising a display disposed in a front surface and a first slide member disposed on each outer periphery edge. The mobile terminal further includes a second body configured to dispose a key pad in a front surface and is slidably coupled to the first body. The second body includes a second slide member disposed along each side of the second body to slidably engage the corresponding first slide member of the first body to allow movement of the first body and the second body to enable one of closed, partially opened, or tilted configurations of the mobile terminal. One of the first and second slide members has a curvature along at least one end such that when the first body is extended from the second body, the first body is tilted at a predetermined angle with respect to the second body. The first body defines a first cavity configured to receive at least a portion of the second body that has the key pad and the second body defines a second cavity which is configured to at least partly receive the first body in the closed position to cover at least part of the key pad.

It is contemplated that the movement of the first body and the second body enables a partially opened configuration of the mobile terminal. It is further contemplated that the key pad is at least partially exposed in the partially opened configuration.

It is contemplated that the first cavity is defined between a first front case and a first rear case of the first body, and the second cavity is defined between a second front case and a second rear case of the second body.

It is further contemplated that a first end of the first front case is connected to a second end of the first rear case, and a third end of the second front case is connected to a fourth end of the second rear case.

It is contemplated that a portion of the first body is inside the second cavity in the tilted configuration of the mobile terminal. It is further contemplated that a portion of the first body is inside the second cavity in the partially opened configuration of the mobile terminal.

It is contemplated that a first plane of the display and a second plane of the key pad are substantially parallel to one another in the closed configuration of the mobile terminal. It is further contemplated that the predetermined angle is an acute angle.

It is contemplated that the second slide member is an elongated rail. It is further contemplated that the curvature is gradually reduced toward another end of one of the first and second slide members.

It is contemplated that the mobile terminal comprises a biasing unit having a first end connected to the first body and a second end connected to the second body, where the first body is biased to the closed, partially opened, or tilted configuration. It is further contemplated that the biasing unit comprises an elastic body or a magnet.

It is contemplated that the mobile terminal comprises a sensing unit for detecting the closed, partially opened, or tilted configuration of the mobile terminal.

It is contemplated that the mobile terminal is configured to enter a mode depending on the closed, partially opened, or tilted configuration of the mobile terminal.

It is contemplated that the display is configured to display the corresponding mode of the mobile terminal. It is further contemplated that the mobile terminal is configured to enter a video display mode or a web-browsing mode in the tilted configuration.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
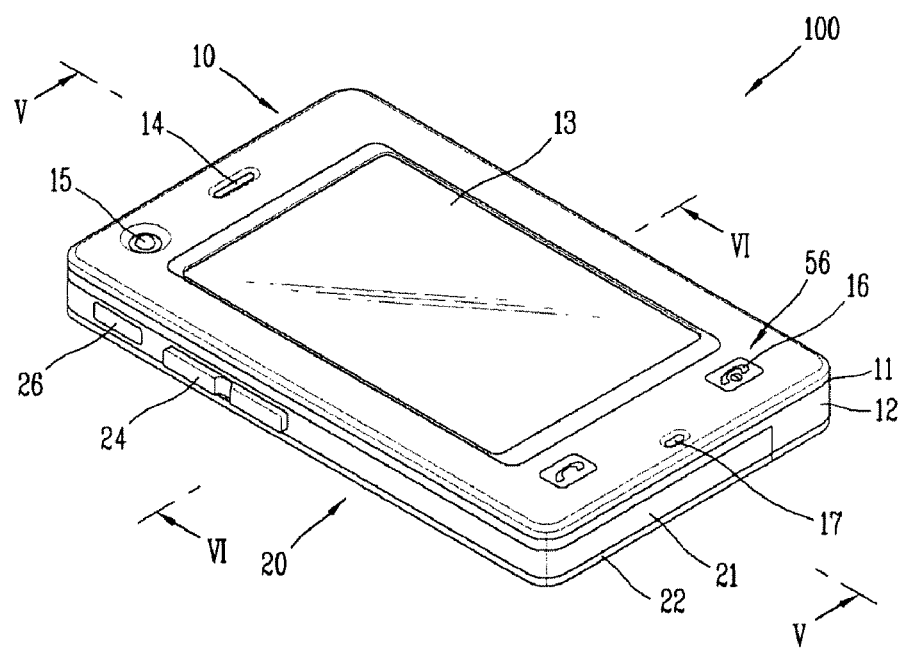
FIG. 1 is a front perspective view showing a closed configuration of mobile terminal 100 in accordance with one embodiment of the present invention.

The present invention relates to mobile terminals. In the following detailed description, reference is made to the accompanying drawing figures which form a part hereof, and which show by way of illustration specific embodiments of the invention. Wherever possible, the same reference numerals will be used throughout the drawings to refer to the same or similar parts.

FIG. 1 is a front perspective view showing a closed configuration of mobile terminal 100 according to an exemplary embodiment of the present invention.

As shown in FIG. 1, the mobile terminal 100 includes a first body 10 and a second body 20, where the second body 20 is configured to be slidably movable along at least one direction relative to the first body 10. However, the mobile terminal 100 of the present invention can be implemented in a variety of different configurations, without being limited to the slide-type shown in FIG. 1.

For example, the mobile terminal 100 of the present invention can be a swing-type, a swivel-type, and combinations thereof. Therefore, the configurations described herein apply equally to other types of mobile terminals.

Figure 2:
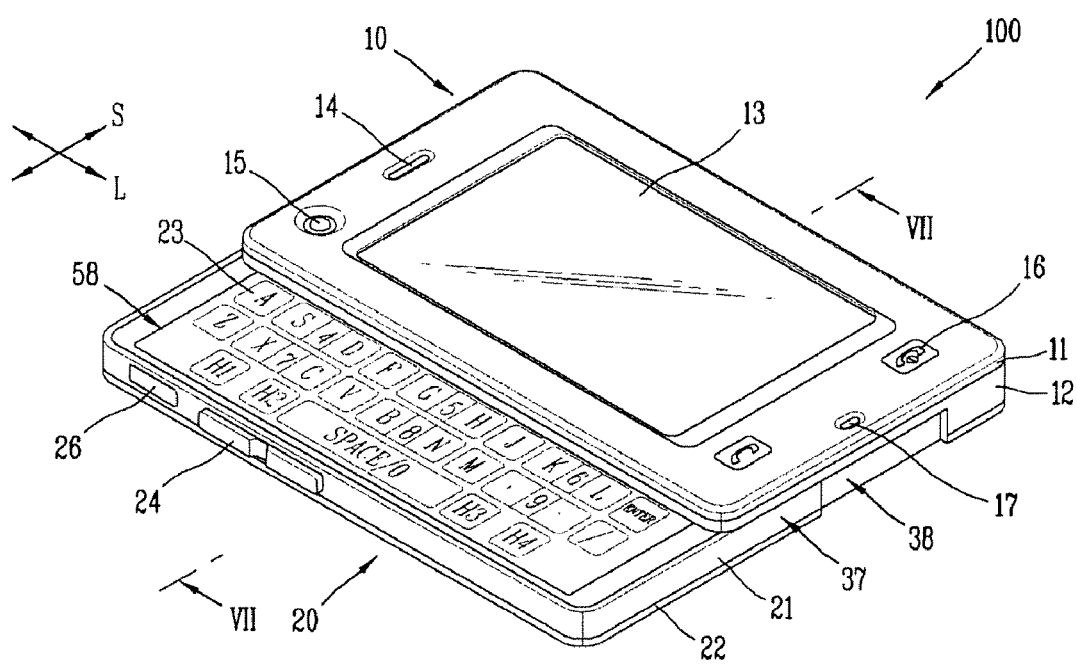
FIG. 2 is a front perspective view showing a partially opened configuration of the mobile terminal 100 in FIG. 1 in accordance with one embodiment of the present invention.

As shown in FIG. 1, a state in which the first body 10 is positioned to overlap or overlie the second body 20 is herein referred to as a "closed configuration," and a state in which the first body 10 and the second body 20 are positioned to expose at least a portion of the second body 20, as shown in FIG. 2, is herein referred to as a "partially opened configuration."

While in the closed configuration, the mobile terminal 100 can operate in a standby mode (also referred to in the art as an "idle mode"), where the standby mode can be disabled in response to a user manipulation. The mobile terminal 100 can operate in a calling mode in the partially opened configuration, and the calling mode can be changed to the standby mode after a predetermined period of time or in response to a user manipulation.

As shown in FIG. 1, the case (also referred to in the art as a "casing," a "housing," or a "cover") constituting the external appearance of the first body 10 comprises a front case 11 and a rear case 12. Various electronic components can be installed in an area between the front case 11 and the rear case 12. One or more intermediate cases may be additionally disposed between the front case 11 and the rear case 12. For example, the front case 11 and the rear case 12 can be formed via an injection-molding technique using a synthetic resin, or can comprise a metallic material such as stainless steel (STS) or titanium (Ti).

As shown in FIG. 1, a display unit 13, an audio output unit 14, a first image input unit 15, a first manipulation unit 16, and an audio input unit 17 may be located on the first body 10, and preferably, on the main surface, such as the front face 56, of the front case 11. Side surfaces extending substantially vertically from the main surface may have a smaller area than the main surface.

The display unit 13 can include a Liquid Crystal Display (LCD), an Organic Light Emitting Diode (OLED) display, or any another type of display that visually displays information. The display unit 13 can further include a touch screen, thereby allowing a user to input information by touching the screen.

The audio output unit 14 may be implemented in the form of a receiver or a speaker. Although the audio output unit 14 is situated on the front face 56 of the front case 10 in FIG. 2, the audio output unit 14 can alternatively comprise a pair of audio output units disposed at each side of the display unit 13.

The first image input unit 15 may be implemented as a camera module suitable for capturing images or video by the user. The first manipulation unit 16 is configured to receive a command input to control an operation of the mobile terminal 100. If a touch screen is employed for the display unit 13, the first manipulation unit 16 may function as an input unit for supporting the touch screen or be replaced by the touch screen. The audio input unit 17 may be implemented in the form of a microphone for receiving a voice input of the user or other sounds.

As shown in FIG. 1, the case (also referred to in the art as a "casing," a "housing," or a "cover") constituting the external appearance of the second body 20 comprises a front case 21 and a rear case 22.

FIG. 2 is a front perspective view showing a partially opened configuration of the mobile terminal 100 in FIG. 1 in accordance with one embodiment of the present invention.

As shown in FIG. 2, the second body 20, and in particular, the front case 21, is exposed as the first body 10 slidably moves along a sliding direction "S" from the closed configuration. For example, the sliding direction "S" can be perpendicular to a lengthwise direction "L" of the first body 10.

As also shown in FIG. 2, a second manipulation unit 23 is disposed on a main surface, such as the front face 58, of the front case 21. In the embodiment shown in FIG. 2, the second manipulation unit 23 comprises a QWERTY keypad. In other embodiments, the second manipulation unit 23 can comprise a keypad having a different arrangement or layout.

Side surfaces extending from the main surface are formed to have a smaller area than the main surface. At least one of the side surfaces of the second body 20, such as side surface 37, is configured to surround one of the side surfaces of the first body 10, such as side surface 38. A portion of the surrounded portion is exposed to the outside in the partially opened configuration.

As shown in FIG. 2, a third manipulation unit 24 and an interface unit 26 can be disposed on at least one of the front case 21 and the rear case 22.

The first manipulation unit 16, the second manipulation unit 23 and the third manipulation unit 24 are collectively referred to herein as the "manipulation unit," and various techniques can be employed for implementing the manipulation unit so long as the manipulation unit can be operated by a user in a tactile manner.

For example, the first manipulation unit 16, the second manipulation unit 23 and the third manipulation unit 24 can be implemented with a dome switch, a touch screen or touch pad configured to receive user commands or information via a press, push or touch from the user. As another example, the first manipulation unit 16, the second manipulation unit 23 and the third manipulation unit 24 can be implemented in the form of a rotatable wheel, a key, a jog, or a joystick.

If the second manipulation unit 23 is implemented as a display having a touch screen, the touch screen can be configured to display soft keys arranged in the QWERTY layout to allow the user to input letters and numbers, as well as characters, such as Korean characters.

Information (or an image) provided by the user via the touch screen, for example, by writing, drawing, or touching the touch screen, or other information associated with the information can be displayed on the display unit 13.

For example, characters or numbers provided by a user via the touch screen can be conveniently displayed on the display unit 13 to facilitate the writing of an email. As another example, an object displayed on the display unit 13 can be moved in a particular direction in response to a direction input provided by a user via the touch screen using a stylus. As a further example, the touch screen can be configured to enable scrolling of a number of menus in response to a touch on the touch screen and a scrolling speed can be configured to vary based on a duration or frequency of the touch.

For example, the first manipulation unit 16 can be used for providing commands, such as start, end, or scroll, and the second manipulation unit 23 can be used for inputting numbers, characters, or symbols. As another example, the third manipulation unit 24 can operate as a hot key for performing a particular function within the mobile terminal 100, such as activating the first image input unit 15.

The interface unit 26 can be used as a link (passage or path) through which the mobile terminal 100 can exchange data with an external device. For example, the interface unit 26 may be implemented as at least one of a power supply port for providing power to the mobile terminal 100, a connection port for connecting an earphone to the mobile terminal 100 via a wired (fixed) or wireless connection, or a port for short-range communications, such as an Infrared Data Association (IrDA) port, a BLUETOOTH™ port, or a wireless LAN port. The interface unit 26 may be implemented as card sockets for receiving external memory cards, such as a Subscribe Identification Module (SIM) or a User Identification Module (UIM), for storing information.

Figure 3:
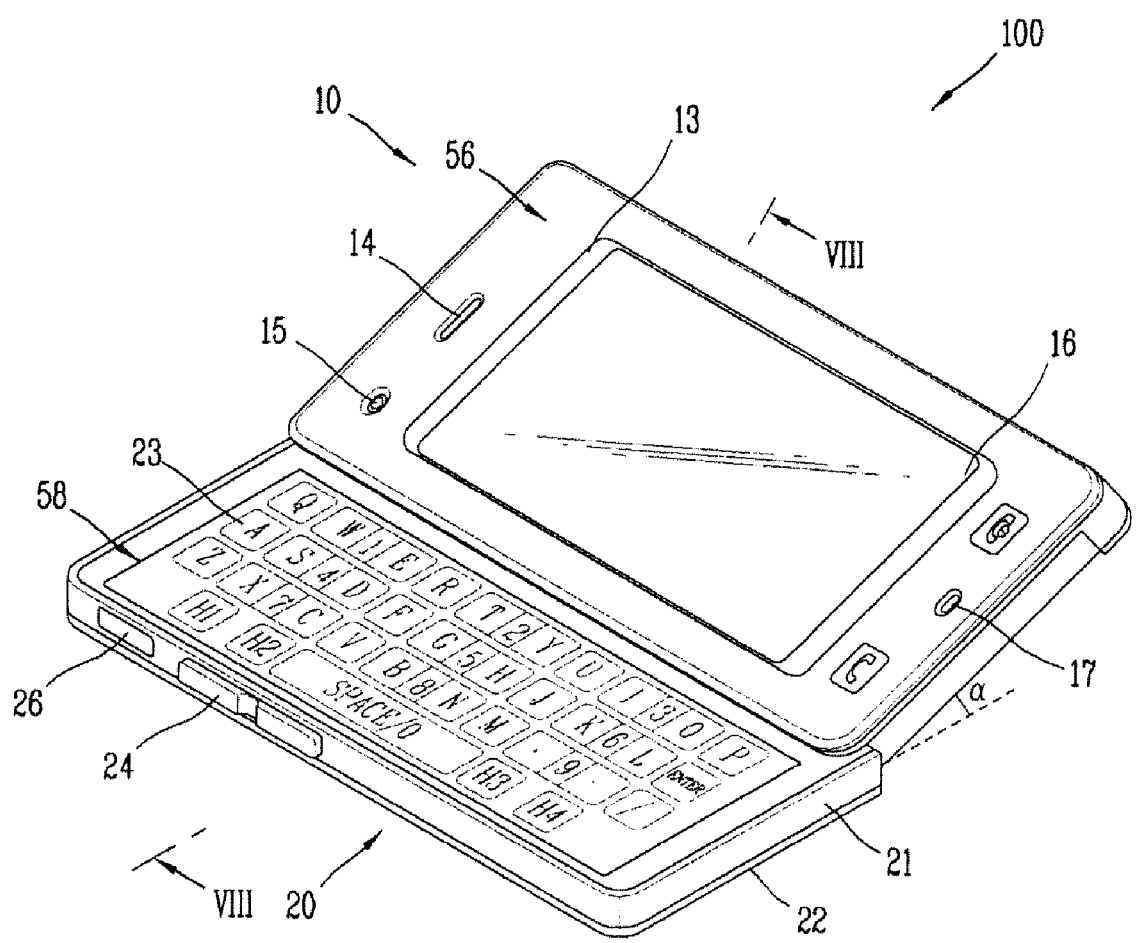
FIG. 3 is front a perspective view showing a tilted configuration of the mobile terminal 100 in FIG. 2 in accordance with one embodiment of the present invention.

FIG. 3 is front a perspective view showing a tilted configuration of the mobile terminal 100 in FIG. 2 in accordance with one embodiment of the present invention.

Referring to FIG. 3, the tilted configuration refers to a state in which the front face 56 of the first body 10 is inclined with respect to the front face 58 of the second body 20. More specifically, in the tilted configuration, a first plane of the first body 10 intersects a second plane of the second body 20.

As shown in FIG. 3, as the first plane of the first body 10 intersects the second plane of the second body 20, the first body 10 and the second body 20 form an angle $\alpha$. Preferably, the angle $\alpha$ is an acute angle in order to provide a more convenient view of the display to the user. In the tilted configuration shown in FIG. 3, the user may operate the second manipulation unit 23 more conveniently while viewing the contents in the display unit 13, than when the angle $\alpha$ is 0.

Figure 4:
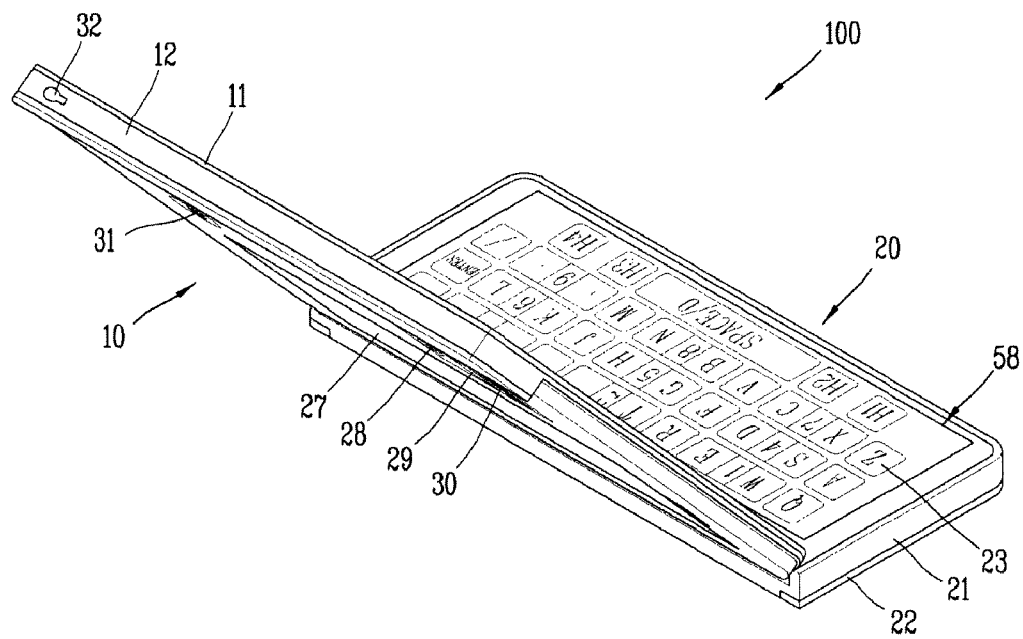
FIG. 4 is a rear perspective view of the mobile terminal 100 in FIG. 3 in accordance with one embodiment of the present invention.

FIG. 4 is a rear perspective view of the mobile terminal 100 in FIG. 3 in accordance with one embodiment of the present invention.

Referring to FIG. 4, a power supply unit 27 for supplying power to the mobile terminal 100 is mounted at the rear case 12 of the first body 10. The power supply unit 27 can be, for example, a rechargeable battery and can be detachably coupled to the rear case 12 for supplying power to the mobile terminal 100 and for recharging.

As shown in FIG. 4, a second image input unit 28 can be located on a rear surface of the rear case 12 of the first body 10. As also shown in FIG. 4, the second image input unit 28 can have a direction of view that is substantially opposite to a direction of view of the first image input unit 15 shown in FIG. 1.

For example, the first image input unit 15 can operate with a relatively lower resolution than the second image capture unit 28 to capture images of the user to enable immediate transmission of the captured images to another party during video call communications. For example, the second image input unit 28 may operate with a higher resolution relative to the first image input unit 15 to capture images of general subjects with high picture quality, which may not require immediate transmission in real-time, but may be stored for later viewing or for communicating to others.

As shown in FIG. 4, a flash lamp 29 and a mirror 30 may be located adjacent to the second image input unit 28. When an image of a subject is captured with the second image input unit 28, the flash lamp 29 illuminates the subject. The mirror 30 allows self-image capturing by allowing the user to see herself when the user desires to capture her own image using the second image input unit 28.

As shown in FIG. 4, the rear case 12 may further include a second audio output unit 31. The second audio output unit 31 can support stereophonic sound functions in conjunction with the first audio output unit 14 shown in FIG. 1 and can also be used for sending and receiving audio calls in a speaker phone mode.

A broadcast signal receiving antenna 32 may be located at one side or region of the rear case 12, in addition to an antenna used for mobile communications. The antenna 32 can be configured to be retractable from the second body 20.

In the above description, the second image input unit 28 is located on the first body 10, however, such a configuration is not meant to be limiting. For example, one or more of the elements described herein, such as the second image input unit 28 and the flash lamp 29 located on the rear case 12, may be located on the second body 20, and more specifically, on the rear case 22.

In one embodiment, where the second image input unit 28 is not provided, the first image input unit 15 can be configured to allow a user to change the direction of view to enable capturing of images in various directions, including the capturing of images in the direction of view of the second image input unit 28. The second manipulation unit 23 shown in FIG. 4 can also be implemented as a keypad for allowing a user to input of information.

Figure 5:
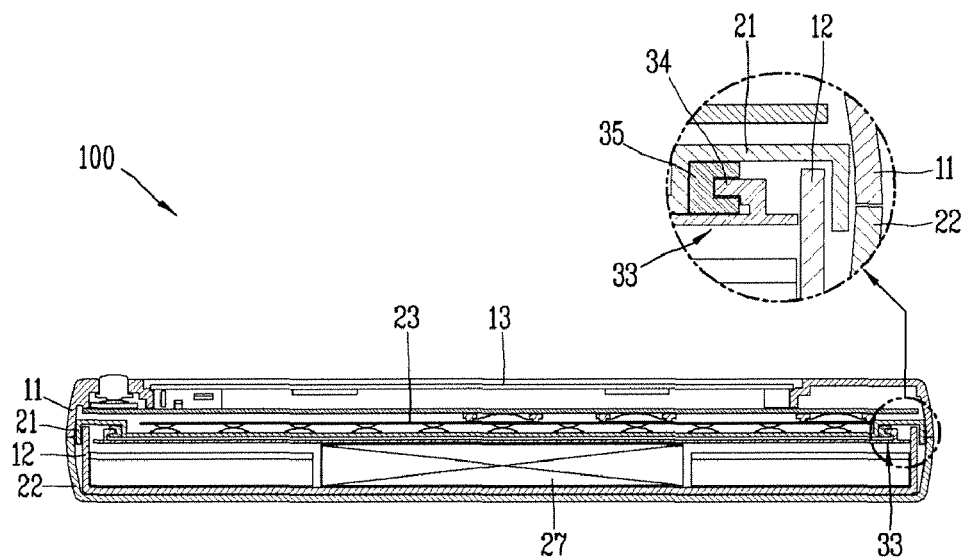
FIG. 5 is a cross-sectional view of the mobile terminal 100 along the line "V-V" in FIG. 1 in accordance with one embodiment of the present invention.

FIG. 5 is a cross-sectional view of the mobile terminal 100 along the line "V-V" in FIG. 1 in accordance with one embodiment of the present invention.

Referring to FIG. 5, the front case 11 of the first body 10 and the rear case 22 of the second body 20 form the exterior of the mobile terminal 100 in the closed configuration. As shown in FIG. 5, the rear case 12 of the first body 10 is substantially surrounded by the rear case 22 of the second body 20. As further shown in FIG. 5, the front case 21 of the second body 20 is substantially covered by the front case 11 of the first body 10. Each side surface of the first body 10 and in particular, each side surface of the rear case 12 is surrounded by each side surface of the second body 20 and in particular, each side surface of the rear case 22. In addition, the front case 11 substantially covers the second manipulation unit 23 located at the front case 21 of the second body 20 such that the second manipulation unit 23 is not exposed.

A slide module 33 coupling the first body 10 to the second body 20 so as to be slidably movable relative to one another is formed at the rear case 12 of the first body 10 and the front case 21 of the second body 20. The slide module 33 allows the first body 10 to be slidably movable along the sliding direction "S" (shown in FIG. 2) with respect to the second body 20 from the closed configuration to the tilted configuration.

The slide module 33 may include a first slide member 34 disposed adjacent to the rear case 12, and a second slide member 35 mounted at the front case 21. The first slide member 34 is slidably coupled to the second slide member 35. The first slide member 34 and the second slide member 35 will be described in greater detail below with reference to FIG. 8.

In one embodiment, and as discussed with respect to FIG. 8 below, the mobile terminal 100 can comprise a biasing unit for biasing the first body 10 to the closed configuration, the partially opened configuration, or the tilted configuration.

Figure 6:
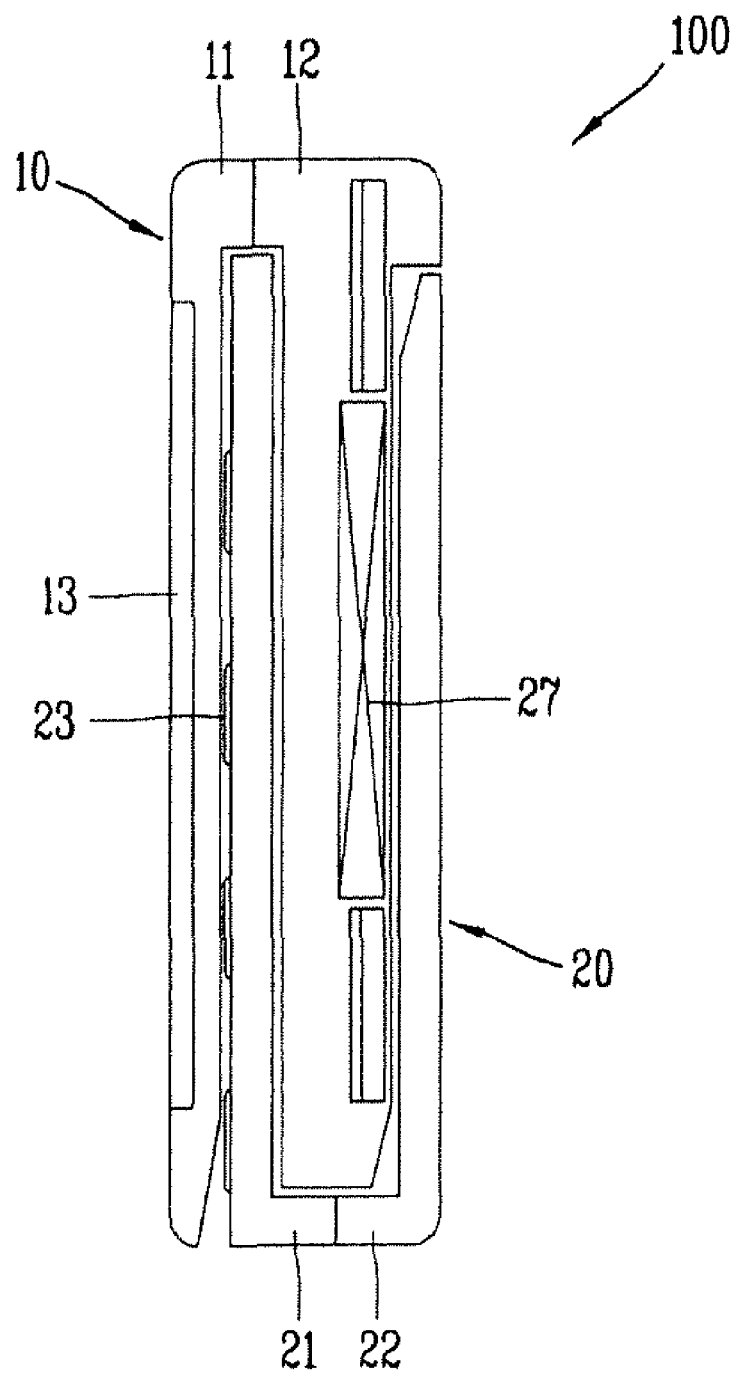
FIG. 6 is a cross-sectional view of the mobile terminal 100 in the closed configuration along the line "VI-VI" in FIG. 1 in accordance with one embodiment of the present invention.

FIG. 6 is a cross-sectional view of the mobile terminal 100 in the closed configuration along the line "VI-VI" in FIG. 1 in accordance with one embodiment of the present invention.

As shown in FIG. 6, the front case 11 and the rear case 12 of the first body 10, and the front case 21 and the rear case 22 of the second body 20, are arranged in the following order from left to right: the front case 11, the front case 21, the rear case 12, and the rear case 22.

In the arrangement shown in FIG. 6, the first body 10 and the second body 20 each provide an opened surface, through which a portion of another body, such as the first body 10 or the second body 20 is received. As shown in FIG. 6, the second manipulation unit 23 mounted at the front case 21 of the second body 20 can be received inside the first body 10. As also shown in FIG. 6, the power supply unit 27 mounted at the rear case 12 of the first body 10 is substantially surrounded by the rear case 22 of the second body 20.

Figure 7:
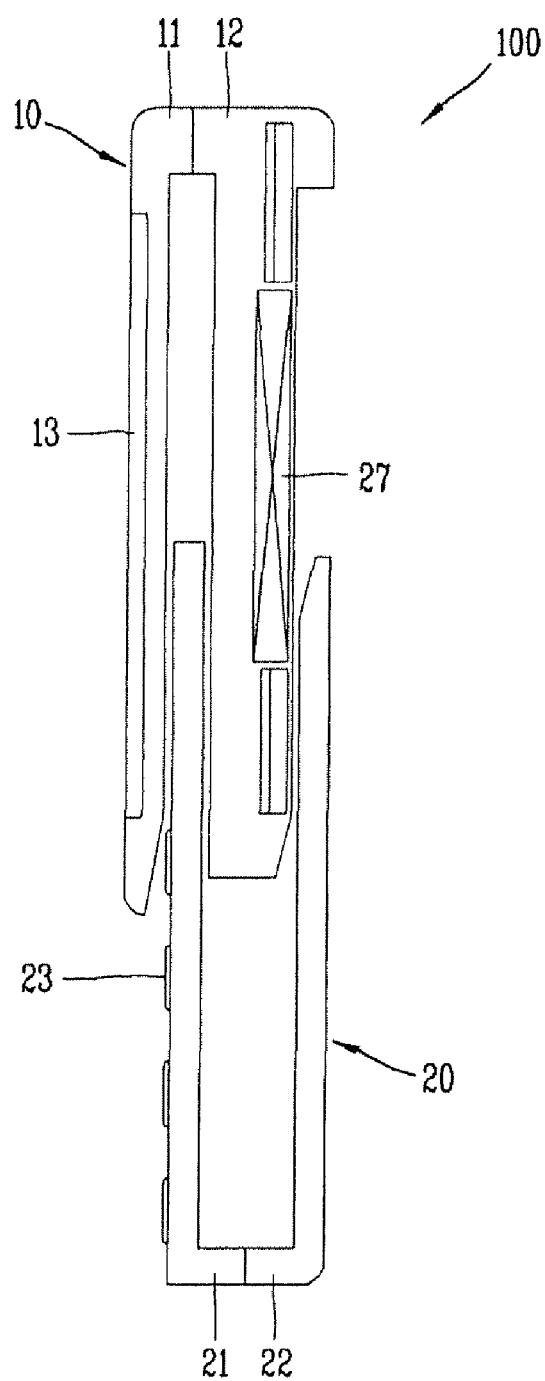
FIG. 7 is a cross-sectional view of the mobile terminal 100 in the partially opened configuration along the line "VII-VII" in FIG. 2 in accordance with one embodiment of the present invention.

FIG. 7 is a cross-sectional view of the mobile terminal 100 in the partially opened configuration along line "VII-VII" in FIG. 2 in accordance with one embodiment of the present invention.

As shown in FIG. 7, when the mobile terminal 100 is in the partially opened configuration, the second manipulation unit 23 is outside of the first body 10 and thus exposed. As also shown in FIG. 7, the power supply unit 27 mounted at the rear case 12 is outside of the second body 20 and thus exposed.

In one embodiment, the front case 11 and the rear case 12 of the first body 10, and the front case 21 and the rear case 22 of the second body 20 are disposed substantially parallel to one another.

Figure 8:
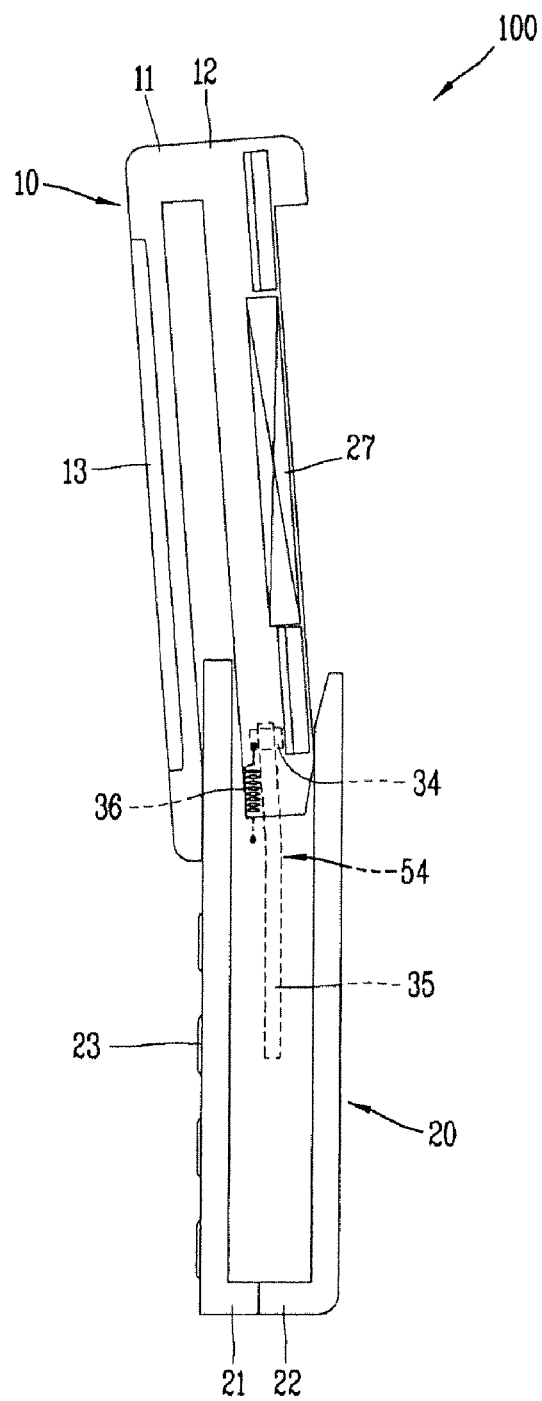
FIG. 8 is a cross-sectional view of the mobile terminal 100 in the tilted configuration along the line "VIII-VIII" in FIG. 3 in accordance with one embodiment of the present invention.

FIG. 8 is a cross-sectional view of the mobile terminal 100 in the tilted configuration along the line "VIII-VIII" in FIG. 3 in accordance with one embodiment of the present invention.

As shown in FIG. 8, the first body 10 of the mobile terminal 100 in the tilted configuration intersects the second body 20.

As shown in FIG. 8, the second slide member 35 is formed to have curvature, where the amount of curvature is gradually reduced toward one end of the second slide member 35. For example, a portion of the second slide member 35 may form a curve with respect to the second body 20, relative to the horizontal or the vertical of the main surface of the second body 20. As shown in FIG. 8, the tilted configuration of the mobile terminal 100 is achieved as the first slide member 34 mounted at the first body 10 is guided via the curved portion 54 of the second slide member 35

In order to maintain the tilted configuration, a means or structure for stopping the first body 10, such the biasing unit 36 shown in FIG. 8, may be formed at the first slide member 34 and the second slide member 35. For example, the biasing unit 36 may include an elastic body or member, such as a spring, where one end of the biasing unit 36 is connected to the first body 10 and another end of the biasing unit 36 is connected to the second body 20. The biasing unit 36 may also be a combination of magnets or magnetic substances disposed at the second slide member 35, which can attach to a magnet disposed at the first slide member 34 by an attractive force.

In one embodiment, the biasing unit 36 may be implemented to provide a protrusion formed at the second slide member 35, which can be stopped by a groove formed at the first slide member 34.

Figure 9:
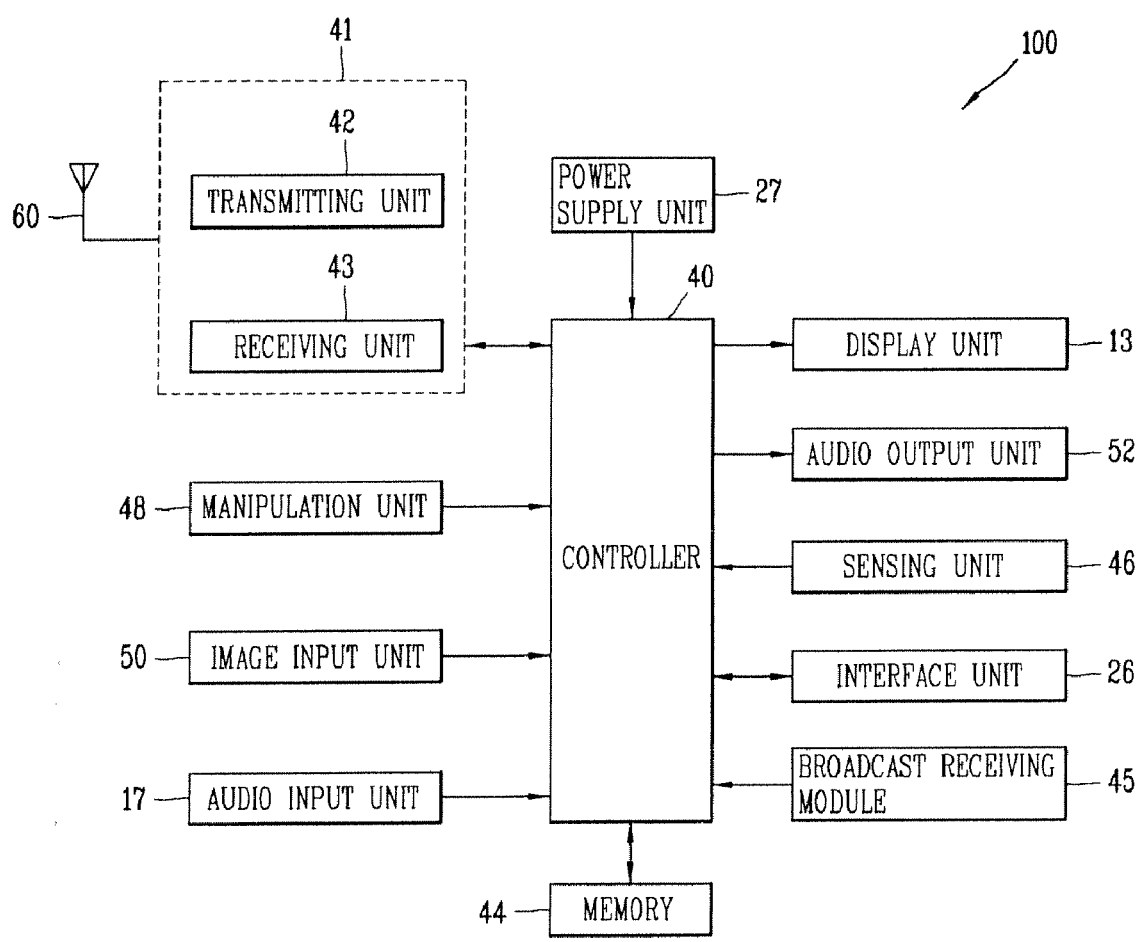
FIG. 9 shows a block diagram of the mobile terminal 100 in accordance with one embodiment of the present invention.

FIG. 9 shows a block diagram of the mobile terminal 100 in accordance with one embodiment of the present invention.

As shown in FIG. 9, the mobile terminal 100 includes a wireless communication module 41, a manipulation unit 48, an image input unit 50, the audio input unit 17, the display unit 13, the audio output unit 52, a sensing unit 46, the interface unit 26, the broadcast receiver module 45, a memory 44, the power supply unit 27, and a controller 40. For example, manipulation unit 48 can comprise the first manipulation unit 16, the second manipulation unit 23, and the third manipulation unit 24 described above. For example, the image input unit 50 can comprise the first image input unit 15 and the second image input 28 described above. For example, the audio output unit 52 can comprise the first audio output unit 14 and the second audio output unit 31 described above.

The controller 40 typically controls the general operations and functions of the mobile terminal 100. For example, the controller 40 can perform control and processing associated with voice calls, data communications, and video calls.

The wireless communication module 41 typically includes one or more components for allowing radio and wireless communication through an antenna, such as antenna 60. For example, the wireless communication module 41 allows communication between the mobile terminal 100 and a wireless communication system or a network in which the mobile terminal 100 is located. As shown in FIG. 9, the wireless communication module 41 can include a transmitting unit 42 for managing the transmission and reception of voice data, text data, image data, control data, and for modulating a signal for transmission. As further shown in FIG. 9, the wireless communication module 41 can include a receiving unit 43 for demodulating a received signal.

The manipulation unit 48, which can comprise at least one of the first manipulation unit 16, the second manipulation unit 23, and the third manipulation unit 24 described above, can generate key input data provided by a user for controlling various operations of the mobile terminal 100 and can provide the key input data to the controller 40. For example, the manipulation unit 48 can comprise a dome switch, a touch screen or a touch pad, such as a touch sensitive member that detects changes in resistance, pressure, or capacitance. As another example, the manipulation unit 48 can comprise a jog wheel or a jog switch.

The image input unit 50, which can comprise at least one of the first image input unit 15 and the second image input unit 28 described above, processes image frames of still pictures or videos obtained by an image capture device in a video call mode or an image capturing mode. The image frames processed by the image input unit 50 may be displayed on the display unit 13, stored in the memory 44, or transmitted via the wireless communication module 41.

The audio input unit 17 is configured to receive sounds or audible signals via a microphone in a phone call mode, a recording mode, or a voice recognition mode, and to process such sounds into digital data. For example, when the mobile terminal 100 is in a phone call mode, the processed audio (voice) data can be converted for output into a format suitable for transmission to a mobile communication base station via the wireless communication module 41. As another example, in a recording mode of the mobile terminal 100, the processed audio data can be stored in the memory 44 for output at a later time. The audio input unit 17 may include various types of noise canceling or suppression algorithms to cancel noise generated in the course of receiving and transmitting audio signals.

The display unit 13 may display information processed in the mobile terminal 100. For example, when the mobile terminal 100 is in a phone call mode, the display unit 13 may display a screen including a user interface (UI) or a graphic user interface (GUI) associated with a call or other communication. When the mobile terminal 100 is in the video call mode or the image capturing mode, the display unit 13 may display a captured image and/or a received image, the UI, and the GUI in a screen displayed in the display unit 13. For example, the display unit 13 can function as an input device and output device if the display unit 13 is provided with a touch screen.

The audio output unit 52, which can comprise at least one of the first audio output unit 14 and the second audio output unit 31 described above, can be configured to output audio data received from the wireless communication module 41, or stored in the memory 44, in a call signal reception mode, a call mode, a recording mode, a voice recognition mode, or a broadcast reception mode. The audio output unit 52 can provide audible outputs related to a particular function, such as a call signal reception sound or a message reception sound, performed by the mobile terminal 100. The audio output unit 52 may include a speaker, a receiver, a buzzer, or other sound generating device.

The sensing unit 46 detects a current status or state of the mobile terminal 100, such as a partially opened or closed state, a location of the mobile terminal 100, or the presence or absence of user contact with the mobile terminal 100. The sensing unit 46 can be configured to generate commands or signals for controlling the operation of the mobile terminal 100.

For example, when the mobile terminal 100 is implemented as a slide type mobile phone, the sensing unit 46 can sense whether the slide phone is in the closed, partially opened, or tilted configuration, and can provide the result to the controller 40. The sensing unit 46 can detect whether the power supply unit 27 supplies power or whether the interface unit 26 is coupled with an external device.

The interface unit 26 serves as an interface via which at least one external device can be connected with the mobile terminal 100. For example, an external device may be a wired or wireless headset port, an external power supply or battery charger port, a wired or wireless data port, a card socket, such as a memory card port, a Subscriber Identity Module (SIM), or a User Identity Module (UIM).

The interface unit 26 may be used to receive inputs, such as data, information, and/or power, from an external device and to transfer the received inputs to one or more elements within the mobile terminal 100. The mobile terminal may also be used to transfer data between the mobile terminal 100 and an external device.

The memory 44 can be used to store software programs used for the processing and controlling operations performed by the controller 40, or to store data, such as a phonebook, a message, a still image, or a video. For example, the memory 44 may include at least one type of storage medium, such as a flash memory, a hard disk, a multimedia card, a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, or a card-type memory, such as a Secure Digital (SD) card or XD memory.

The broadcast receiver module 45 receives a broadcast signal and/or broadcast associated information from an external broadcast managing server via a satellite channel and a terrestrial channel. The broadcast receiver module 45 converts the received broadcast signal into an appropriate format to enable display of the broadcast on the audio output unit 52 and the display unit 13. The broadcast receiver module 45 can receive additional data associated with broadcast, such as an electronic program guide (EPG) or a channel list. A broadcast signal and/or broadcast-associated information received via the broadcast receiver module 45 can be stored in the memory 44.

The power supply unit 27 receives external or internal power and supplies power required for operating respective elements and components under the control of the controller 40.

The controller 40 can be configured to enter different modes and to appropriately display the corresponding modes on the display unit 13 according to the partially opened configuration and the tilted configuration.

For example, the display unit 13 may be configured to display a short message transmission mode if the mobile terminal 100 is determined to be in the partially opened configuration. As another example, the display unit 13 may be configured to enter one or more available modes which require the user to interact with the mobile terminal 100 for an extended period of time, such as modes for displaying a video or web-browsing, if the mobile terminal 100 is determined to be in the tilted configuration.

Therefore, when in the tilted configuration, the mobile terminal 100 can provide even greater convenience to the user by providing the user an improved viewing angle of the display unit 13 of the mobile terminal 100 in the various modes typically requiring extended periods of interaction between the user and the mobile terminal.

Since the second body 20 is coupled to the first body 10 so as to surround the side surfaces of the first body, and since the second manipulation unit 23 is received in the first body 10, the mobile terminal 100 of the present invention provides structural stability regardless of the configuration of the mobile terminal 100, such as the closed, partially opened, or tilted configuration. Moreover, since the display unit 13 intersects the second manipulation unit 23 by the slide module in the tilted configuration, the user can utilize the second manipulation unit 23 and the display unit 13 of the mobile terminal 100 with greater convenience Depending on the type of implementation, it is possible that the present invention can take the form of an entirely hardware embodiment, an entirely software embodiment or an embodiment containing both hardware and software elements. A software embodiment may include, but not be limited to, firmware, resident software, or microcode.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A slide type mobile terminal comprising:
    a first body comprising a display disposed on a front surface;
    a second body configured to have a key pad disposed on its front surface and slidably coupled to the first body; and
    a slide module configured to allow movement of the first body and the second body in order to enable a closed configuration or a tilted configuration of the mobile terminal,
    wherein the first body defines a first cavity configured to receive at least a portion of the second body;
    wherein the second body defines a second cavity configured to at least partly receive the first body in the closed configuration to cover at least part of the key pad,
    wherein the first body comprises a first front case and a first rear case, the first front and rear cases defining the first cavity therebetween and the first rear case defining an area for installing electronic components and a power supply unit,
    wherein the second body comprises a second front case having the key pad disposed therein and a second rear case at least partly covering a rear surface and side surfaces of the first rear case, the second front and rear cases defining the second cavity therebetween,
    wherein the slide module comprises a first slide member disposed at an inner side of each periphery edge of the first rear case and a second slide member disposed along each inner side of the second body to slidably engage the corresponding first slide member, and
    wherein either the first or second slide members has a curvature along at least one end such that the first body is tilted at a predetermined angle with respect to the second body when the first body is extended from the second body.

2. The mobile terminal of claim 1, wherein the movement of the first body and the second body enables a partially opened configuration of the mobile terminal.

3. The mobile terminal of claim 2, wherein the key pad is at least partially exposed in the partially opened configuration.

4. The mobile terminal of claim 1, wherein a portion of the first body is inside the second cavity in the tilted configuration of the mobile terminal.

5. The mobile terminal of claim 2, wherein a portion of the first body is inside the second cavity in the partially opened configuration of the mobile terminal.

6. The mobile terminal of claim 1, wherein a first plane of the display and a second plane of the key pad are substantially parallel to one another in the closed configuration of the mobile terminal.

7. The mobile terminal of claim 1, wherein the predetermined angle is an acute angle.

8. The mobile terminal of claim 1, wherein the second slide member is an elongated rail.

9. The mobile terminal of claim 1, wherein the curvature is gradually reduced toward another end of one of the first and second slide members.

10. The mobile terminal of claim 1, further comprising a biasing unit having a first end connected to the first body and a second end connected to the second body, wherein the first body is biased to the closed or tilted configuration.

11. The mobile terminal of claim 2, further comprising a biasing unit having a first end connected to the first body and a second end connected to the second body, wherein the first body is biased to the closed, partially opened, or tilted configuration.

12. The mobile terminal of claim 10, wherein the biasing unit comprises an elastic body or a magnet.

13. The mobile terminal of claim 1, further comprising a sensing unit for detecting the closed or tilted configuration of the mobile terminal.

14. The mobile terminal of claim 2, further comprising a sensing unit for detecting the closed, partially opened, or tilted configuration of the mobile terminal.

15. The mobile terminal of claim 13, wherein the mobile terminal is configured to enter a mode depending on the closed configuration or tilted configuration.

16. The mobile terminal of claim 14, wherein the mobile terminal is configured to enter a mode depending on the closed, partially opened, or tilted configuration.

17. The mobile terminal of claim 15, wherein the display is configured to display the corresponding mode of the mobile terminal.

18. The mobile terminal of claim 13, wherein the mobile terminal is configured to enter a video display mode or a web-browsing mode in the tilted configuration.

* * * * *